United States Patent
Maget

(10) Patent No.: US 12,128,354 B2
(45) Date of Patent: Oct. 29, 2024

(54) ELECTROCHEMICAL NITROGEN GENERATOR SYSTEM AND METHOD

(71) Applicant: M & R Consulting Services, Inc., San Diego, CA (US)

(72) Inventor: Henri Maget, San Diego, CA (US)

(73) Assignee: M & R Consulting Service, Inc., San Diego, CA (US)

( * ) Notice: Subject to any disclaimer, the term of this patent is extended or adjusted under 35 U.S.C. 154(b) by 520 days.

(21) Appl. No.: 17/538,931

(22) Filed: Nov. 30, 2021

(65) Prior Publication Data

US 2022/0226774 A1 Jul. 21, 2022

Related U.S. Application Data

(63) Continuation-in-part of application No. 15/965,912, filed on Apr. 28, 2018, now abandoned.

(51) Int. Cl.
*B01D 53/22* (2006.01)
*B01D 53/32* (2006.01)

(52) U.S. Cl.
CPC ........ *B01D 53/32* (2013.01); *B01D 2257/102* (2013.01); *B01D 2257/104* (2013.01)

(58) Field of Classification Search
CPC .............. B01D 53/32; B01D 2257/104; B01D 2257/102
See application file for complete search history.

(56) References Cited

U.S. PATENT DOCUMENTS

| | | | | |
|---|---|---|---|---|
| 3,983,021 A | * | 9/1976 | Henis | B01D 53/32 423/213.2 |
| 5,526,641 A | * | 6/1996 | Sekar | F01N 3/08 123/585 |
| 5,640,845 A | * | 6/1997 | Ng | B01D 53/32 60/275 |
| 5,649,517 A | * | 7/1997 | Poola | B01D 53/22 123/585 |
| 5,807,466 A | * | 9/1998 | Wang | B01D 53/32 204/177 |

(Continued)

*Primary Examiner* — Anthony R Shumate
(74) *Attorney, Agent, or Firm* — Myers Andras Ashman Bisol LLP; Joseph C. Andras

(57) ABSTRACT

An Electrochemical Nitrogen Generator System and Method. The system and method provide the ability to create a nitrogen-rich environment in containers of a variety of sizes. The system and method are able to extract the oxygen from the air within the container without reducing the internal pressure substantially below atmospheric. A version of the method is provided to reduce the oxygen content and replace it with nitrogen through a series of sequential fractional steps. In another form, the system and method will provide a "streaming" approach of bleeding off oxygen-containing contents of the container, while continuously replacing it with air until such time as the percentage of oxygen within the container is below the desired level. In yet another version, the system and method operate under pressure, thereby injecting pressurized air, either in sequential fractional steps or via continuous flow, whereby at the end of the process, the internal contents of the container are in a pressurized nitrogen environment, and the oxygen expelled from the container during the process is also under pressure.

20 Claims, 12 Drawing Sheets

(56) References Cited

U.S. PATENT DOCUMENTS

| | | | | |
|---|---|---|---|---|
| 5,836,154 | A * | 11/1998 | Williamson | B01D 53/32 60/275 |
| 6,136,158 | A * | 10/2000 | Wang | B01D 53/32 204/177 |
| 6,171,368 | B1 | 1/2001 | Maget et al. | |
| 2006/0062709 | A1 * | 3/2006 | Cho | B01D 53/8621 423/239.1 |
| 2009/0178556 | A1 * | 7/2009 | Hoshi | F02M 27/045 95/28 |
| 2014/0120003 | A1 * | 5/2014 | Huang | B01D 53/925 422/180 |
| 2015/0135714 | A1 * | 5/2015 | Benn | F02G 1/044 60/671 |
| 2017/0087509 | A1 * | 3/2017 | Wolford | B01D 53/32 |
| 2019/0009208 | A1 * | 1/2019 | Maget | B01D 53/326 |

\* cited by examiner

ELECTROCHEMICAL NITROGEN GENERATOR SYSTEM AND METHOD

This application is a Continuation-in-Part of application Ser. No. 15/965,912, filed Apr. 28, 2018.

BACKGROUND OF THE INVENTION

1. Field of the Invention

This invention relates generally to the product packaging and preservation and, more specifically, to an Electrochemical Nitrogen Generator System and Method.

2. Description of Related Art

Preservation of oxygen-sensitive items, such as food, medication, sera, artifacts, manuscripts, etc most times requires the absence of oxygen. The level of oxygen present should be as low as possible, particularly if these items have to be preserved over long durations. Historically, the options for reducing the oxygen concentration surrounding such items have been: flushing the container with nitrogen while the container is being filled with the contents (e.g. medicine into vials); oxygen removal via ab- or ad-sorbent materials after the container has been filed with the contents; via applying a vacuum to the container after filling with the contents; or by the extraction of oxygen (such as by electrolytic cell).

The industrial filling of vials while under nitrogen environment, conducted on a large scale at high filling rates, allows oxygen levels to be reduced to a concentration of about 2-3%, which may be adequate for some contents, but typically is not acceptable for prolonged durations of storage or highly sensitive contents.

Application of a vacuum would generally yield an oxygen concentration of 5%, while resulting in a vacuum level of 0.24 atmospheres (absolute), which may also result in the removal of chemicals distilling from the items to be protected (i.e. water and the like). However, rigid containers must be used in order to sustain the internal vacuum, and these containers are highly susceptible to leakage because they are constantly maintained at a pressure much lower than the surrounding environment.

Absorbents that either bind or react with the oxygen have limited removal capabilities in as much as large amounts of absorbents may be required to protect the items, making this approach cost-prohibitive.

In the cases of artifacts such as fabrics or manuscripts, libraries must install large storages of nitrogen, at the exterior of buildings and supply a stream of nitrogen to counteract any oxygen that may leak into the system. This approach is also cost-prohibitive for many circumstances.

One patent—U.S. Pat. No. 6,171,368 by Maget for "Gas Extraction from Closed Containers" (Maget 368) presents another option, namely electrochemical extraction of oxygen from medical vials, also described in an article[1] specifically citing the protection of epinephrine (a compound extremely sensitive to oxidative degradation). This invention allows oxygen reduction to levels of 1,000 ppm (0.1%) or below, which is more than adequate for prevention of oxidation over long durations, at a vacuum that is never below 0.8 atmosphere. The problem with the Maget 368 design is that the limitations of the Electrolytic Cell and the associated power supply restricts its applicability to small containers (e.g. small vials).

[1] International Journal of Pharmaceutical Compounding 1999 No. 6, pp 493-495

The drawbacks in each of these examples illustrates that there is a need for improved, low-cost techniques and systems for viably protecting items from degradation due to oxygen contamination while preventing the creation of a vacuum.

SUMMARY OF THE INVENTION

In light of the aforementioned problems associated with the prior devices and methods, it is an object of the present invention to provide an Electrochemical Nitrogen Generator System and Method. The system and method should provide the ability to create a nitrogen-rich environment in containers of a variety of sizes. The system and method should be able to extract the oxygen from the air within the container without reducing the internal pressure substantially below atmospheric. A version of the method should be provided to reduce the oxygen content and replace it with nitrogen through a series of sequential fractional steps. In another form, the system and method should provide a "streaming" approach of bleeding off oxygen-containing contents of the container, while continuously replacing it with air until such time as the percentage of oxygen within the container is below the desired level. In yet another version, the system and method should operate under pressure, thereby injecting pressurized air, either in sequential fractional steps or via continuous flow, whereby at the end of the process, the internal contents of the container are in a pressurized nitrogen environment, and the oxygen expelled from the container during the process is also under pressure.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a/an Electrochemical Nitrogen Generator System and Method.

Figure 1:
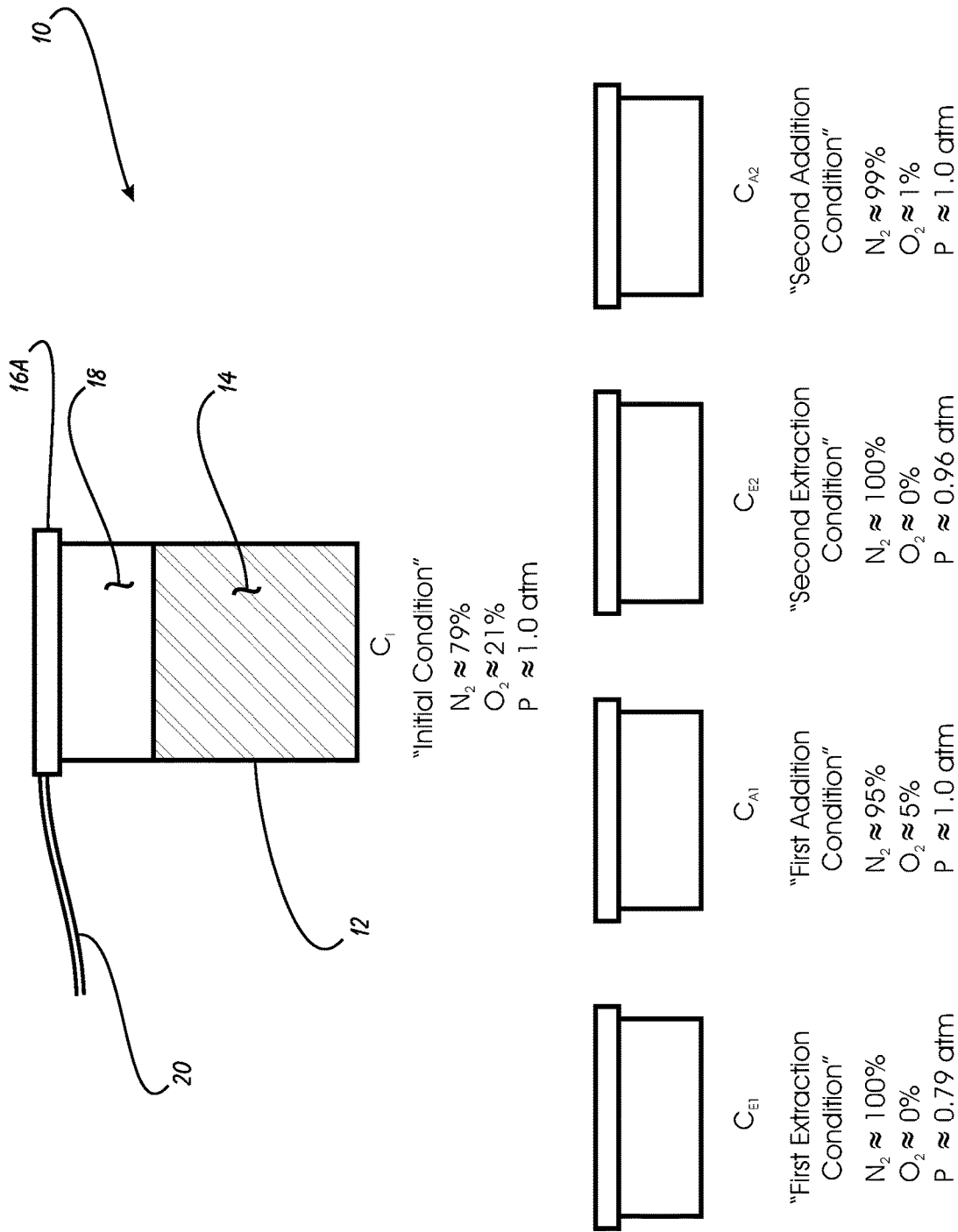
FIG. 1 is a series of diagrams of the steps of a preferred embodiment of the method of the present invention.

The present invention can best be understood by initial consideration of FIG. 1.[2] FIG. 1 is a series of diagrams of the steps of a preferred embodiment of the method of the present invention. These depictions are intended to provide a visual introduction to the system and method, without limiting the scope of the invention in any way. The depicted iterative $N_2$ concentrator system 10 of the present invention comprises a container 12 and an extractor cap 16A sealing the mouth of the container 12. A power source 20 (either integrated battery or some external source) provides power to the extractor cap 16A. The protected contents 14 are sealed within the container 12. These contents 14 could be solid or liquid—presumably selected from the group of contents that are harmed by prolonged exposure to $O_2$.

[2] As used throughout this disclosure, element numbers enclosed in square brackets [ ] indicates that the referenced element is not shown in the instant drawing figure, but rather is displayed elsewhere in another drawing figure.

In addition to the contents 14 is also a head volume 18. This volume 18 is that part of the internal sealed volume of the container 12 that is not filled with the contents 14—it includes the volume above the contents 14, as well as around the contents 14 (in the case of solid contents). Immediately after being sealed, the head volume 18 has an initial condition of air at atmospheric pressure—condition $C_I$ is, then: 1 atmosphere in pressure, approximately 78% nitrogen, 21% oxygen, and 1% of inert gases (mainly argon). For the purpose of this invention, the inert gases are incorporated in a nitrogen-equivalent of 79%.

The process for removing the $O_2$ from the container 12 and replacing it with $N_2$ is one of a series of $O_2$ extraction steps, with each extraction step followed by the replacement of the extracted $O_2$ with air. After the oxygen is removed from the head volume 18 (starting at $C_I$), the first extraction condition is reached—condition $C_{E1}$ is: 0.79 atmosphere pressure, approximately 100% nitrogen, and virtually 0% oxygen. This should be intuitively obvious, since the volume of the oxygen within the head volume 18 has been removed.

Next, after the head volume is re-filled to atmospheric pressure with air (replacing the $O_2$ that has been removed), the interior of the container 12 will reach the first addition condition—$C_{A1}$ is 1 atmosphere in pressure, approximately 95% nitrogen, and approximately 5% of oxygen. This reduction in $O_2$ is simply because the pure $O_2$ that was removed has been replaced by gas that only contains approximately 21% oxygen.

Assuming that 5% is still an unacceptably high $O_2$ concentration, a second $O_2$ extraction is performed until the container 12 reaches a second extraction condition—$C_{E2}$ is approximately 0.96 atmosphere pressure, approximately 100% nitrogen, and virtually 0% oxygen.

Assuming that the slightly vacuum state of the head volume 18 is unacceptable, a second air addition step is performed so that the interior of the container reaches second addition condition—$C_{A2}$ is 1 atmosphere in pressure, approximately 99 percent nitrogen content, and approximately 1 percent oxygen content.

While other versions of the method and system are a part of the present invention, even in this simplest form, it can be seen that this iterative step-down in oxygen concentration has a substantial benefit over the prior approaches because (a) it can be performed on a wide range of sizes of containers; (b) there is no restriction regarding the type of protected contents that can be $N_2$-packed by this method; (c) it does not require the use of rigid containers; (d) there is no added risk of contamination inherent in vacuum-packed packages; and (e) it does not require costly chemical absorbents. Table I provides an example of the method with:

TABLE I

| | | | STEP 1 | STEP 2 | STEP 3 | STEP 4 |
|---|---|---|---|---|---|---|
| | Initial Condition | Extract Oxygen | add 210 cc air | extract oxygen | add 44.1 cc air | extract oxygen |
| Container volume: 1000 cc | | | | | | |
| $V_N$, cc | 790 | 790 | 790 + 165.9 | 955.9 | 955.9 + 34.84 | 990.74 |
| $P_T$, atm | 1.00 | 0.79 | 1.00 | 0.9559 | 1.00 | 0.99074 |
| $C_O$, % | 21% | 0% | 4.41% | 0% | 0.926% | 0% |

$V_N$ = nitrogen volume, cc; $V_O$ = oxygen volume, cc; $P_T$ = total pressure in container, atm; $C_O$ = concentration of oxygen in the container, %

The last step to achieve a pressure of 1.00 atmosphere would be to add 9.26 cc of air, containing 7.32 cc of nitrogen and 1.94 cc of oxygen for a final volume of 1,000 cc and an oxygen concentration of 0.194% or 1940 ppm of oxygen.

Note that total amount of oxygen removed to create that purity level of nitrogen is 263.36 cc (210+44.1+9.26). Therefore, the efficiency of these steps is 210/263.36=79.7%. The concentration of oxygen $C_O=0.21^{n+1}$, where (n) represents the number of (extract/add) steps. For a targeted value of $C_O$ the number of steps can be calculated.

Note also that this illustration is not meant to imply that oxygen concentration levels of 0% are achievable by the extractor and that, in fact, oxygen concentrations of ca. 0.5-1% are acceptable and yet prevent oxidative degradation. We will consider such a more practical case in the following, albeit the same arguments are possible.

Furthermore, the addition of streams of air does not have to be conducted in individual discrete steps but can also be achieved in a continuous manner, i.e. with an air intake leak that would cease to operate as internal and external pressure become equal. Practically, if a concentration of oxygen of 5% is adequate for preservation of item in container, a concentration easily achievable with the electrochemical extractor, the following conditions are possible:

Table II

Container volume 1000 cc.

|  | Initial condition | Extract 96% $O_2$ | Add 201.6 cc air |
|---|---|---|---|
| $V_N$, cc | 790 | 790 | 949.264 |
| $V_O$, cc | 210 | 8.4 | 50.736 |
| $P_T$, atm | 1.00 | 0.7984 | 1.00 |
| $C_O$ % | 21% | 10.52% | 5.07% |

An initial extraction of 96% of the initial oxygen present would be adequate to achieve a 5% atmosphere of oxygen. Therefore, individual steps do not require deep oxygen removal.

Table III below provides a comparison to a conventional vacuum-evacuation system:

Table III

Vacuum needed to achieve various oxygen concentration levels in a jar

| Equipment | Extractor | Vacuum Pump |
|---|---|---|
| Atmospheric pressure, mmHg (psia) | 760 (14.7) | 760 (14.7) |
| 5% oxygen level*, mmHg (psia) | 638 (12.3) | 181 (3.5) |
| 0.1% oxygen level (1000 ppm), mmHg (psia) | 601 (11.6) | 2 (0.04) |
| Absence of oxygen, mmHg (psia) | 600 (11.6) | 0 (0) |

*commercial 20 inch Hg vacuum pump

As can be seen, the 5% oxygen concentration level is achieved by the extractor at a benign pressure of 638 mmHg that does not affect the jar contents. However, at a level of 181 mmHg required by the vacuum pump, considerable water evaporation occurs as well as the possibility to extract low vapor pressure chemicals, if present. For a vacuum pump to achieve low oxygen levels (1000 ppm=0.1%) a near absolute vacuum is required, a task requiring expensive turbo mechanical pumps.

Figure 2:
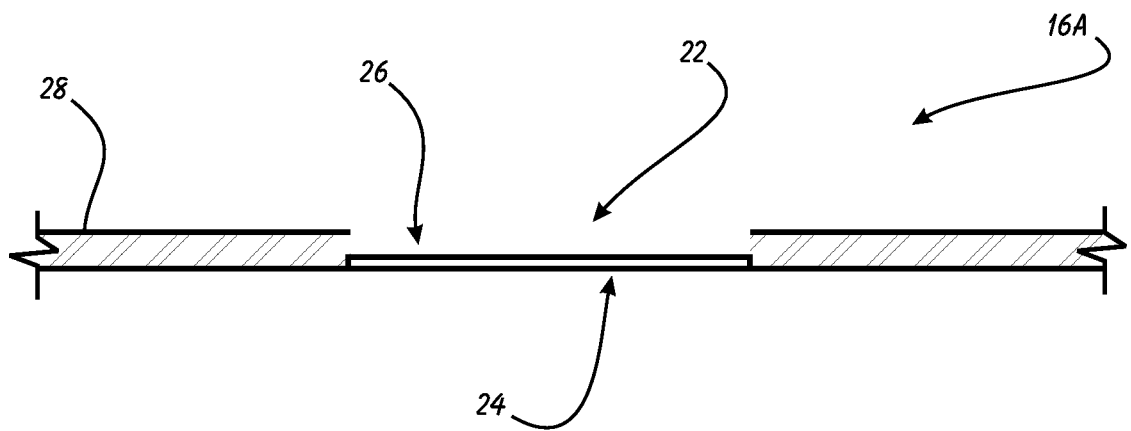
FIG. 2 is a partial cutaway side view of a preferred extractor cap of the system of the present invention.

FIG. 2 provides additional detail regarding the structure of the instant design. FIG. 2 is a partial cutaway side view of a preferred extractor cap of the system of the present invention. Effectively, this is the same design discussed in Maget 368 (incorporated herein by reference), with the possible exception of employing an external power supply instead of an onboard battery.

Figure 3:
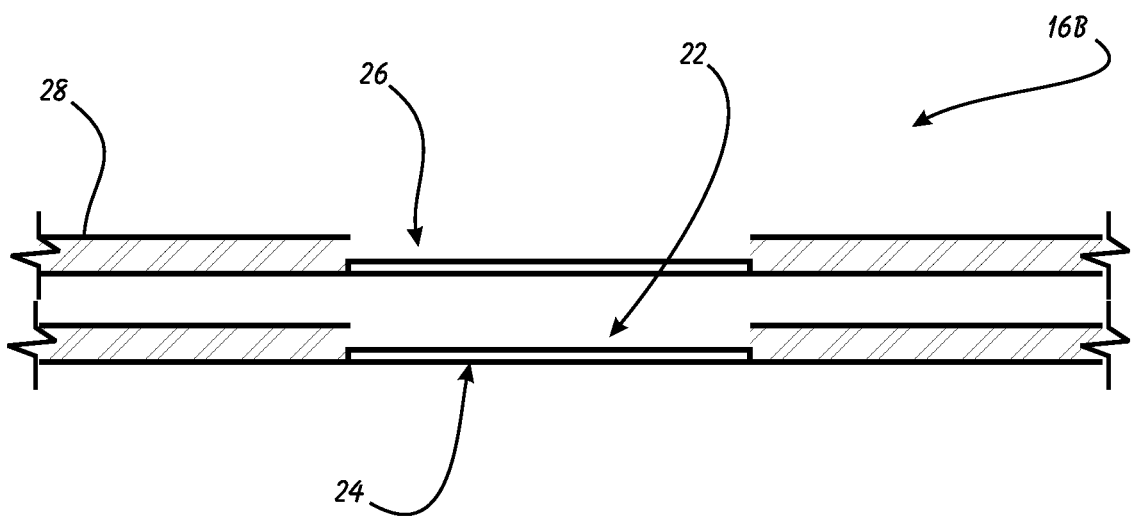
FIG. 3 is a partial cutaway view of a preferred stacked extractor cap of the system of the present invention.

There is a conventional electrolytic cell 22 (EC 22), which is attached to a substrate 28 (such as a cap that threads onto the opening of the container [12]). The EC 22 is defined by an inlet port 24 (through which oxygen is drawn via electrolytic reaction), and outlet port 26 (from which the $O_2$ is expelled). In cases where additional $O_2$ removal capability is desired, it is possible to stack electrolytic cells 22 atop on another as depicted in FIG. 3. In this stacked extractor cap 16B, each of the cells 22 are exposed to the head volume [18] so that they all are simultaneously extracting $O_2$ from that volume [18].

Figure 4:
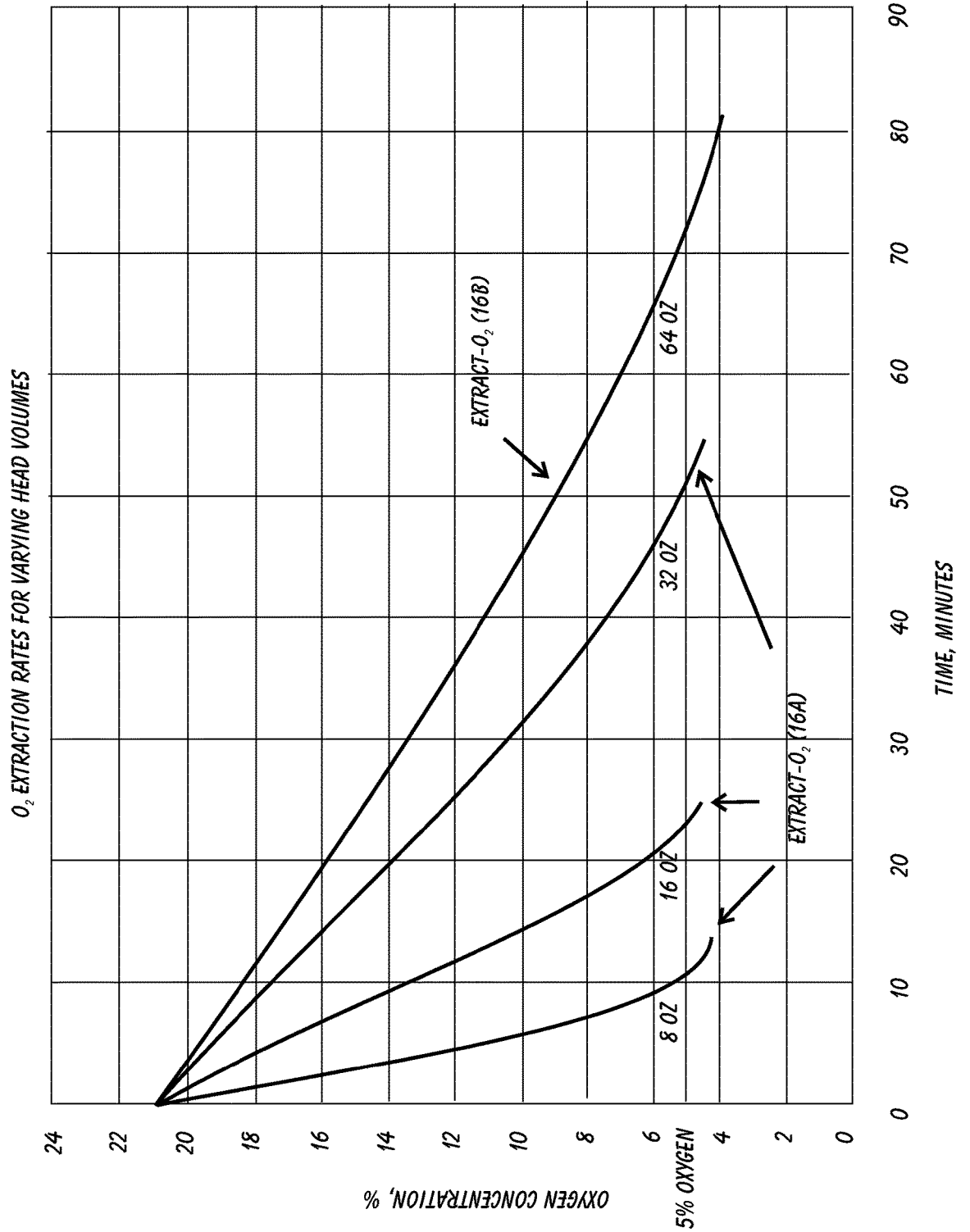
FIG. 4 is a graph depicting $O_2$ extraction rates of the system and methods of the present invention.

FIG. 4 depicts the curves of oxygen concentration versus time for four different scenarios. The first three curves depict the $O_2$ concentration changes for a container [12] having 8 ounce, 16 ounce and 32 ounce head volumes [18], respectfully, using extractor cap [16A]. The fourth curve depicts the rate of $O_2$ concentration changes for a container [12] having a 64 ounce head volume [18] using a 2-EC stacked extractor cap [16B].

Figure 5:
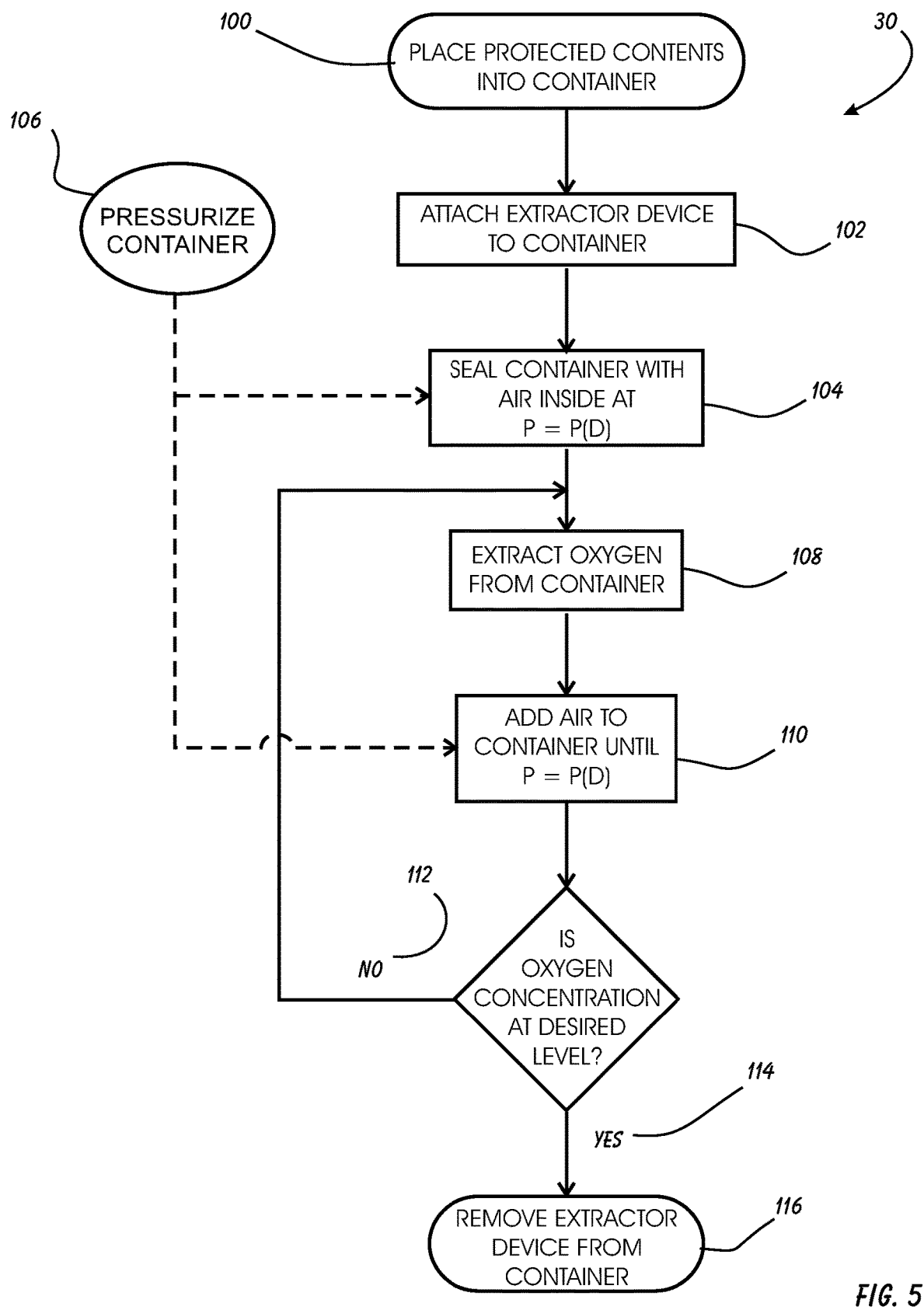
FIG. 5 is a flowchart depicting the steps of a preferred sequential $N_2$ concentration method of the present invention.
Figure 6:
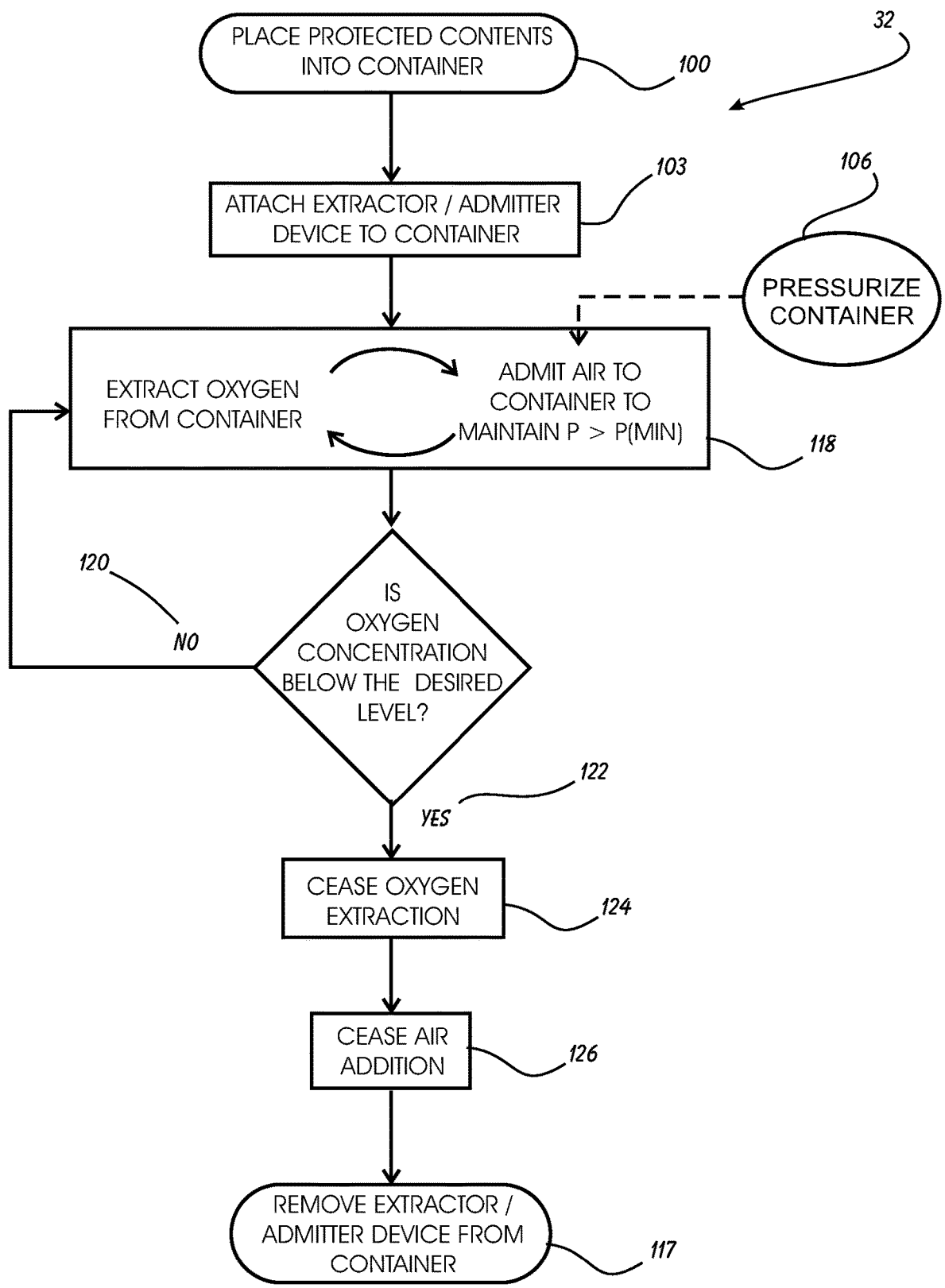
FIG. 6 is a flow chart depicting the steps of a preferred continuous $N_2$ concentration method of the present invention.

The process of $O_2$ removal is further detailed in FIGS. 5 and 6. FIG. 5 is a flowchart depicting the steps of a preferred sequential $N_2$ concentration method 30 of the present invention. After placing the protected contents (e.g. medicine, food, etc.) into the container 100, the extractor device (caps [16A] or [16B] or other) to the container 102, after which the container is sealed 104, so that the internal pressure is at the desired (endpoint) pressure P(D).

If it is desired that the contents be packaged under pressure, then the container will be pressurized with compressed air 106—making the P(D) the elevated pressure.

The oxygen is then extracted from the container to the desired $O_2$ state (typically to total removal of all $O_2$) 108. Next, air is added to the container until the internal (head volume) pressure reaches P(D)—the pressurized air source 106 will be applied, if appropriate.

If the oxygen concentration has been reduced to the desired level 114, then the extractor device is removed from the container 116. If the removal of additional oxygen is desired 112, then steps 108 and 110 are repeated until the $O_2$ level (and $N_2$ level) in the head volume reaches the desired level 114.

FIG. 6 is a flow chart depicting the steps of a preferred continuous $N_2$ concentration method of the present invention. In this method 32, instead of employing discrete $O_2$-removal steps and Air-addition steps, the system [10] employs the approach of maintaining a continuous extraction of $O_2$ while simultaneously adding Air to the head volume continuously.

After placing the contents into the container 100, the extractor/admitter device (cap or other structure) is attached to the container 103. As will be discussed below, the extractor/admitter device has a mechanism for admitting air into the container at a controlled rate in a continuous fashion, while also including an electrolytic cell [22] or stacked cells in operation to remove $O_2$ from the air in the head volume [18].

Once sealed and pressurized with air 106, oxygen is extracted from the container while air is admitted into the container so as to maintain the internal pressure above P(MIN) 118. Presumably, both the $O_2$ extraction rate and the air admission rate are controllable and adjustable. If the oxygen concentration is not at the desired level 120, then the extraction/addition process 118 continues. Once the desired $O_2$ concentration is reached 122, oxygen extraction and air addition are both ceased 124, 126 (simultaneously or sequentially, depending on the structure). Subsequently, the extractor/admitter device is removed from the container 117.

The air intake leak defined as intake leakage rate, R, cc/hr=$\beta \Delta P$, where $\beta$ is a coefficient cc/hr-atm and $\Delta P$ is the pressure difference between exterior vs interior of container namely (1-PT) since the exterior pressure is 1 atm and the container total pressure is PT≤1.

In this instance for a 1000 cc container, after the extractor has removed all oxygen, the air intake volume will be 210 cc of which 44.1 cc is oxygen for a final oxygen concentration of 4.41%.

Initially the $\Delta P$=0.21 atm, the oxygen concentration is zero and the highest intake rate of air is achieved, namely (0.21$\beta$) and after some time, when the container pressure is at 1 atm, the intake rate vanishes to zero, the container is at atmospheric pressure and the oxygen content is 4.41%. No further gas flow takes place except for diffusional transfers, oxygen in, nitrogen out.

In essence, opening the container to air and immediately closing it would yield the same end result as a slow intake leak, except that atmospheric pressure would be created instantly, but it would not be possible to achieve oxygen levels below 4.41%, unless the sequence (extract/add) is repeated.

To achieve a pressure of 0.998 atm, i.e. practically atmospheric pressure, using a leak with a β value of 10 liters/hr-atm the vent needs to stay open for 28 minutes.

However, this process would not yield an environment with an oxygen concentration below 4.41%. This would be the practical case when the leak is opened and subsequently closed, and the process is repeated.

Instead of multiple stages, the process can be continuous with an extractor AND an air intake leak operating steadily until equilibrium is achieved and the container maintained at atmospheric pressure and low oxygen concentration. In that instance the total pressure remains at approximately 1 atm. Since whenever a certain oxygen volume is removed from the container an equivalent volume of air is admitted into it. The volume of oxygen in the container becomes: $V_{OX}=V^0{}_{OX}(e^{-kt})=0.21\ V_T(e^{-kt})$ and the volume of nitrogen is $V_{N2}=V_T(1-0.21e^{-kt})$, where: $k=0.79\ \alpha\ I_O\ SP_T/V_T$ with $\alpha=0.23$ liters/Ahr; $I_O=0.5$ A/cm²-atm of oxygen; $P_T$=gas pressure of 1 atm, and S=total electrode surface area, 2 m², that is the product of single cell active area, s (cm²) and total number of cells.

For the continuous operation the only requirement is that the rate of air intake should not affect the extractor performance. For an intake restrictor defined by the rate (R) of air intake such that:

$$R=\beta(P_{ambient}-P_T)=\beta\Delta P, \text{ where } \beta \text{ in liters/hr-atmosphere}$$

For a balance system operation $\beta\Delta P=\alpha I_O P_O$

If a factor $f=\beta\Delta P/\alpha I_O SP_O$ defines the ratio (rate of air input/rate of oxygen output), the system for f<1 will result in restrictor interference with the oxygen output, whereas if f=the system will operate essentially as a closed system, and if f>1, the system is open loop, operating unrestricted.

The basic requirement will be that at the time of the largest oxygen extraction rate (at time zero), $0.21\ \beta\Delta P>dV_O/dt$ and this condition needs to be satisfied for small values of $\Delta P$.

EXAMPLE

The container volume is 1 liter; the volume oxygen is 0.210 liter, the balance being inert gas volume of 0.790 liters. The extractor cell area is 16 cm². The time-dependent nitrogen and oxygen volumes in the container for two different operating conditions are reported in the following table:

| Time, hours | Sealed Container | | Continuous Air Intake Container | |
|---|---|---|---|---|
| | Volume, Liters: | | | |
| | Nitrogen | Oxygen | Nitrogen | Oxygen |
| 0 | 0.790 | 0.210 | 0.790 | 0.210 |
| 0.50 | 0.790 | 0.084 | 0.898 | 0.102 |
| 0.79 | 0.790 | 0.049 | 0.933 | 0.067 |
| 1.00 | 0.790 | 0.033 | 0.951 | 0.049 |
| 1.50 | 0.790 | 0.013 | 0.976 | 0.024 |
| 2.00 | 0.790 | 0.005 | 0.988 | 0.012 |

To achieve the same volumetric oxygen content, let's say 0.049 liters, the time will increase from 0.79 hours to 1 hour, using the continuous method. However, the continuous process yields a nitrogen-rich gas at atmospheric pressure, whereas the sealed container is under vacuum of 0.839 atm abs.

If atmospheric pressure is required, i.e. to prevent affecting the container contents, the user needs to add 0.161 liters of air, containing 0.033 liters of oxygen for a total of 0.082 liters of oxygen for a nitrogen purity of 0.918.

The average current between the oxygen limits 21 and 5% is 0 885 amps or 55 mA/cm². The Ahr required are respectively 0.885 times 0.79=0.70 and 0.885 for the sealed versus the continuous air-intake container method.

In this case the intake leak can be constant without affecting high quality of nitrogen or closed after completion of the 6 hours process.

The leak can be a short micro-bore tubing, or a Porex plug or any sized restrictor.

In order to fully expand on the potential versions of the system of the present invention, FIGS. 7 through 11 have been provided. Each depicts a distinct structural and/or operational setup that provides unique operational benefits.

Figure 7:
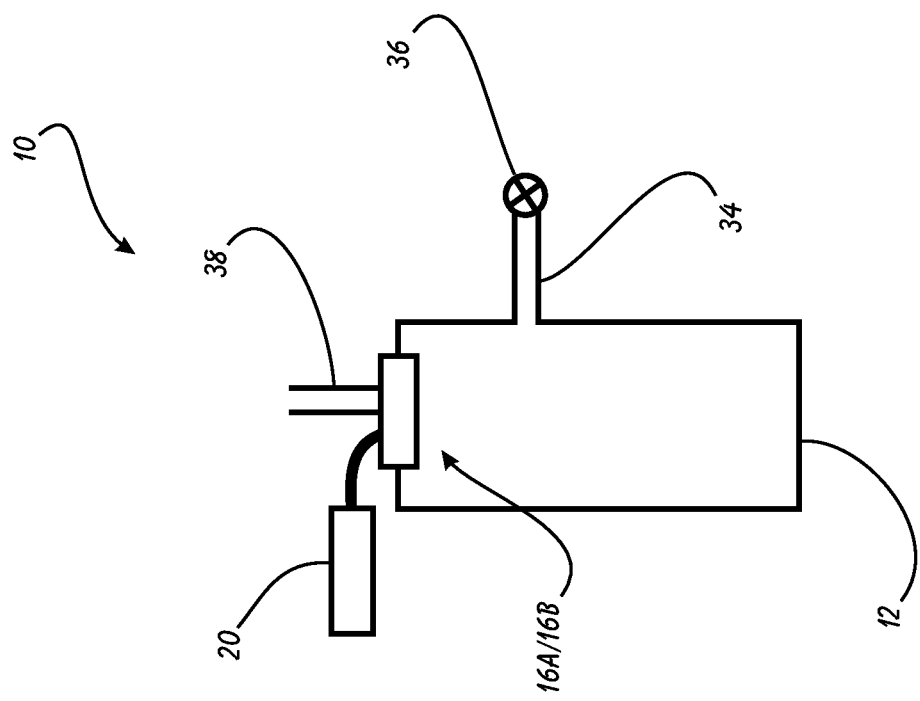
FIG. 7 is a side view of the system of FIG. 1.

FIG. 7 is a side view of the system 10 of FIG. 1. The power source 20 could be a battery or an external source. The cell could be a single cell 16A or a stacked cell 16B. Air is regulated in its addition via air intake line 34 to the container 12 via air shutoff valve 36. Oxygen extracted from the air in the container by the cell 16A/16B is dispersed via exit line 38. This system 10 typically will operate via the method of FIG. 5. Container 12 is filled with air at atmospheric pressure, and valve 36 is closed. By applying a voltage of 1.55 volts from power supply 20 to the extractor 16A/16B, oxygen is reduced at the cathode of the cell in the extractor and released as oxygen via line 38 to the environment. Since air consists of about 21% of oxygen and 79% of inert gases, mainly nitrogen, the container will eventually be absent of oxygen, thereby leaving pure Nitrogen in the container under an absolute pressure of 0.79 atmosphere (i.e. under a small vacuum). By opening valve 36, air will be allowed into the container until the total pressure is that of the environment. In other words, if the container volume is $V_T$ cc's, $0.21\ V_T$ will be filled with air containing 21% of oxygen, that is $4.41\ V_T$ of oxygen will now be present at atmospheric pressure, once valve 36 is closed. Therefore, the oxygen concentration will now be 4.41%. By repeating that step another time, the oxygen concentration will become 21% of 4.41% or 0.926%; the oxygen concentration can be described as $0.21^{n+1}$. Note: the voltage to be applied is a multiple of 1.6-1.55 volts depending upon the number of cells.

Therefore, to obtain a nitrogen purity of 95+% only one extraction step will be required followed by an exposure to environmental air and nitrogen will be available at atmospheric pressure. For multiple steps resulting in more concentrated nitrogen at atmospheric pressure the only difference is the need to extract the equivalent of oxygen of $[0.21\ V_T(1+0.21+0.21^2+0.21^3+\ldots 0.2^n)]$=rather than $0.21\ V_T$ for a ratio of 1.266, i.e. a difference of 26%.

In a related embodiment, the power supply 20 required to operate extractor 16A/16B is optionally a constant voltage/variable current source supplying 1.6-1.55 volts to extractor 16A/16B, to achieve the maximum current (limiting current) possible, or a variable current source with a voltage limiter limiting the applied voltage to 1.6-1.55 volts.

Figure 8:
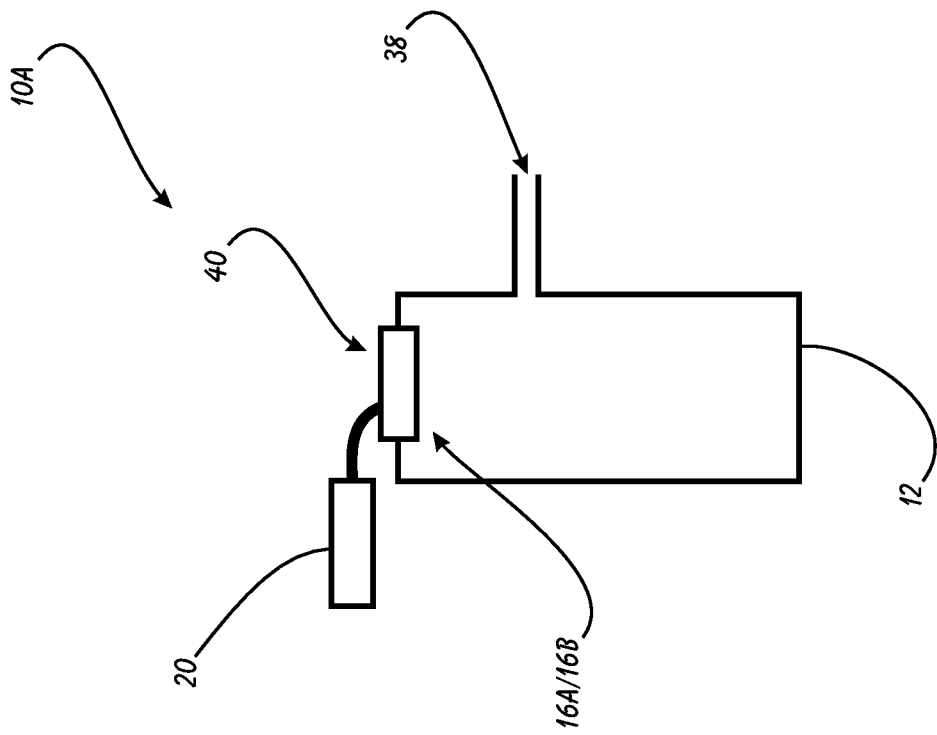
FIG. 8 is a side view of a preferred embodiment of a continuous flow $N_2$ concentration system of the present invention.

FIG. 8 is a side view of a preferred embodiment of a continuous flow $N_2$ concentration system 10A of the present invention. Here, the air is allowed to enter into the chamber continuously via air intake port 38, and oxygen to exit via discharge port 40. The process of oxygen out-air in is continuous, yielding the same end result.

For example, a chamber of 1,000 liters (1 m$^3$) has to be maintained at an inert gas concentration of at least 99% at atmospheric pressure and room temperature to preserve archival records kept under glass, and only infrequently taken out of the chamber. The limiting current density for the extractor operating initially on air, being about 0.15 amperes/cm$^2$, the k-value of the nitrogen generation system becomes equal to $1.7 \times 10^{-4}$ (hr-cm$^2$)$^{-1}$. Since the "pump down" duration in not critical, the total operating area of the extractor is selected to be 500 cm$^2$ for a k-value of 0.085 hr$^{-1}$. The resulting characteristics of the system are described in the following table.

| Form of application | Stationary or movable cabinetry |
|---|---|
| Frequency of container opening | Infrequent |
| Time to "pump down" to 99% nitrogen, hrs | 36 |
| Cell size, cm$^2$ | 25 |
| Number of cells | 20 |
| Maximum cell current, amps | 3.75 |
| Maintenance current at 99% nitrogen, amps | 0.188 |
| Generator voltage, DC volts | 33 |
| Maximum generator power, watts | 125 |
| Rejection rate of oxygen at maintenance level, L/hr | 0.86 |
| Equivalence to an air intake rate of L/hr | 4.9 |
| Estimated generator size, cm × cm × cm | 8 × 8 × 20 |

The operating system requires an AC/DC converter as a power source located either internally or externally to the chamber, a nitrogen gas circulating fan and a small air intake aperture. Once the 99% nitrogen concentration is achieved, the generator can be either stopped or continue idling with a capability to further enrich the nitrogen or to act as maintenance equipment should an air intake leak occur at a rate not exceeding 5 liters/hr, or the equivalence of 0.5% of the container volume per hour. The dual functions of the generator are beneficial since the chamber can be maintained at a high nitrogen concentration without the need of "flushing" the system. After opening the chamber to the air environment, the generator will automatically resume oxygen extraction until the desired nitrogen concentration is achieved.

Figure 9:
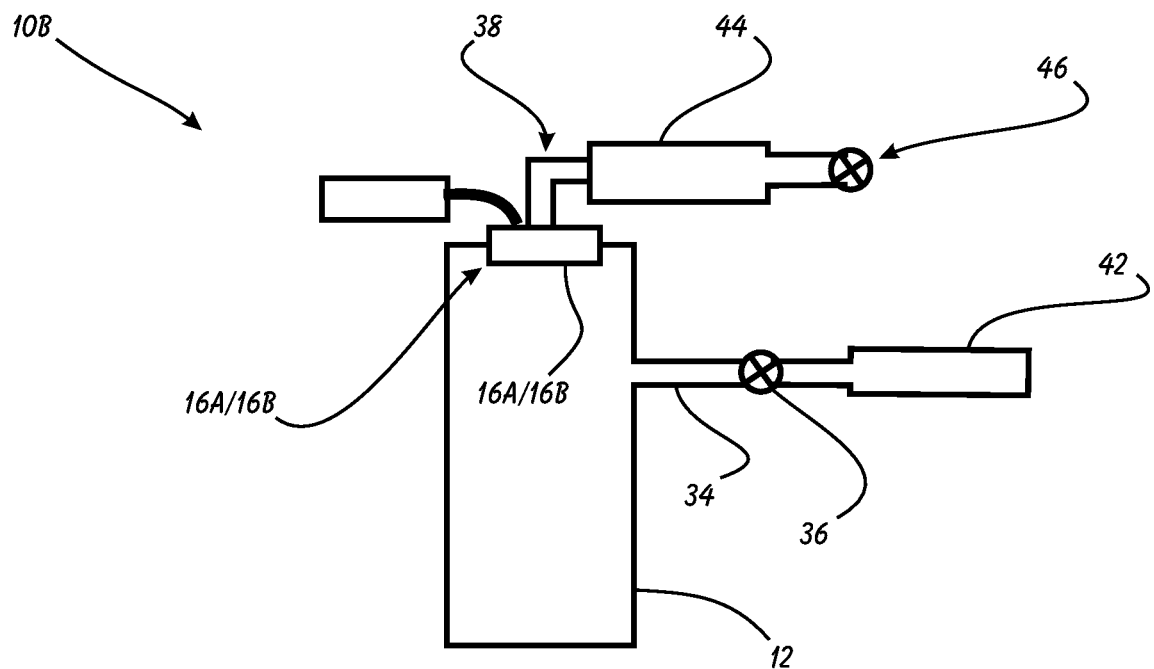
FIG. 9 is a side view of a preferred embodiment of a pressurized $N_2$ concentrator system of the present invention.

FIG. 9 is a side view of a preferred embodiment of a pressurized N$_2$ concentrator system of the present invention. Here, compressed air in tank (or other source) 42 supplied to container 12 is used also as a source of nitrogen to produce compressed high concentration nitrogen. Oxygen released from extractor 16A/16B is compressed in container 44 without the intervention of a compressor. The electrochemical anode of the cell(s) in extractor 16A/16B allow(s) the oxygen to be stored under compression to the extent that the electrochemical cell is designed to tolerate pressure differences between the cathode and anode.

Figure 10:
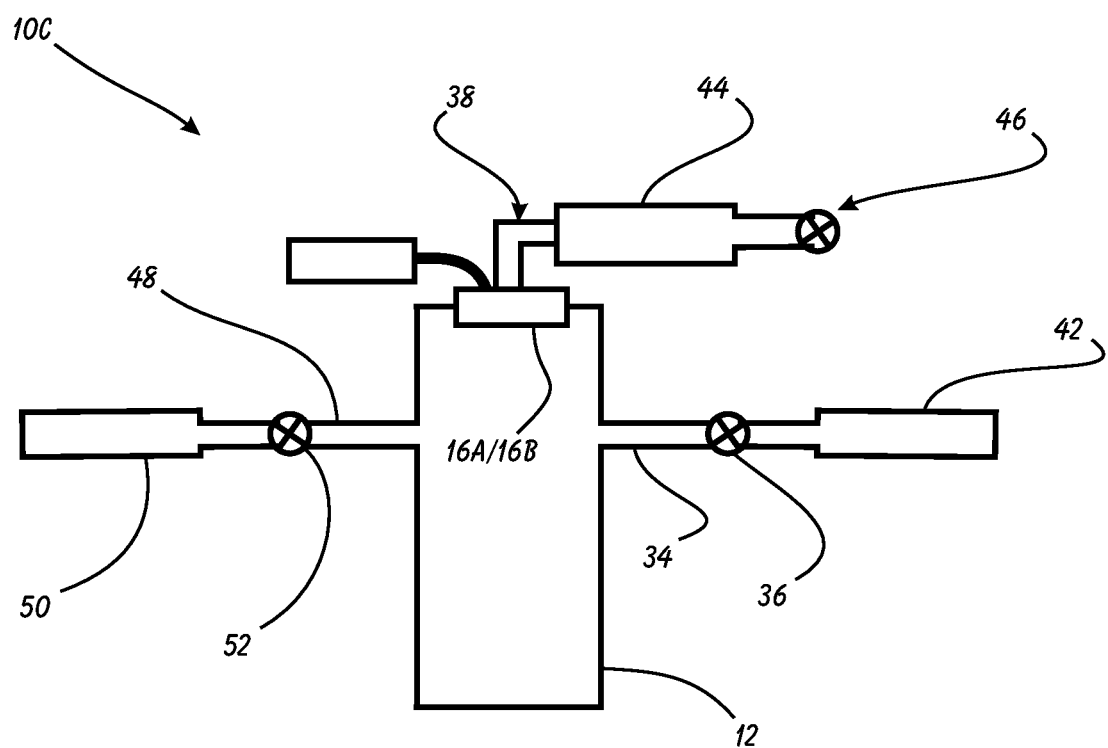
FIG. 10 is a side view of a preferred embodiment of an $O_2/N_2$ air fractionation system of the present invention.

FIG. 10 is a side view of a preferred embodiment of an O$_2$/N$_2$ air fractionation system 10C of the present invention. Compressed air at 10 atmospheres (e.g.) is available from tank 42 either as a constant air source or as produced from an air compressor. Compressed air is also initially available at 10 atm in the main processing tank 12, with a capacity of 1 m$^3$ or 1,000 liters of gas, holding electrochemical stack 16B, designed to withstand maximum pressure differences of up to 10 atm.

Stack 16B (for example) consists of 80 series-connected cells each 10 cm×10 cm in size, thus an area of 100 cm$^2$ each. The stack voltage is about 120 volts DC operating at a maximum current of 100 amps. (At a pressure of 10 atm, or an initial oxygen pressure of 2.1 atm, the limiting current will be about 1 amps/cm$^2$ or I$_{max}$=100 amps, thus an equivalent of 8,000 amps equivalent (the product of Amps/cell times the number of cells) for the extraction of oxygen at a maximum rate of 0.23 Liters/Ahr×8,000=1,840 liters-atm/hr or 184 liters of oxygen at 10 atm.

With valves 36, 52 and 46 closed, the power supply 20 is activated, thereby extracting oxygen from container 12 to be released into tank 44 with a movable wall (piston) to maintain the oxygen under pressure. Since container 12 holds 205 liters of oxygen at 10 atm, (or 2050 liters @1 atm), and since the pump-down is targeted at 4% of oxygen, the total volume of oxygen to be removed will be 1,700 liters-atm requiring 7400 amps-hr equivalent. Since the average current per cell is approximately 51 amps, the duration to 4% will be about 1.8 hours, and the container pressure will be 8.3 atm. If the nitrogen quality is acceptable the gas in container 12 can be released to storage 50 through line 48 and open valve 52.

If a better grade of nitrogen is required, container 12 is re-supplied with compressed air from tank 42, before nitrogen is withdrawn. In that instance, the oxygen concentration will increase to 6.9%. Before re-activating the power supply, the container will hold 69.8 liters of oxygen at 10 atm. After extracting 375.5 liters-atm of oxygen to reduce the oxygen content in nitrogen to about 3.4%, the process will require an additional 1624 A-hr delivered over a period of about 0.8 hours.

The effectiveness of the dual activation of the power source becomes $(0.205-0.04) \times 1,000 \times 10/2075.5 = 79.5\%$. The electric energy requirements for each operating cell are: 179 and 201.6 whr for the production, respectively, of 9600 and 9800 liter-atm of nitrogen.

At the end of step 2, 98% nitrogen can be released from container 12 by opening valve 52, and the cycle can be restarted.

A further modification of this fractionation process would consist in conducting the process in a continuous manner similarly to that [10A] illustrated in FIG. 8. However in this instance nitrogen can be removed in a continuous manner by keeping any discharge valve open, while compressed air is fed continuously from 38 into processing container 12. The results of this exemplary process are provided below in Table V.

TABLE V

Conditions of Air Fractionation Method of the Invention

| Product Gas Composition | 96% N$_2$ (4% O$_2$) | 98% N$_2$ (2% O$_2$) |
|---|---|---|
| Number of steps | 2 | Continuous |
| Container volume. Liters | 1,000 | 1,000 |
| Air source pressure, atm | 10 | 10 |
| Initial liters-atm oxygen | 2050 | 2050 |
| Initial liters-atm nitrogen | 7950 | 7950 |
| Liters-atm oxygen extracted | 1700 | 1850 |
| Liter-atm oxygen remaining | 350 | 200 |
| Liter-atm air entering second step | 1700 | N/A |
| Liters-atm oxygen added | 348.5 | 477 |
| Liters-atm oxygen at start step 2 | 698.5 | N/A |
| Liters-atm oxygen extracted step 2 | 375.5 | N/A |
| Pressure end step 1, atm | 8.3 | 10.0 |
| Required Ahr to extract oxygen | 9,024 | 10,120 |
| Number of cells in stack | 80 | 80 |

TABLE V-continued

Conditions of Air Fractionation Method of the Invention

| Product Gas Composition | 96% N$_2$ (4% O$_2$) | 98% N$_2$ (2% O$_2$) |
|---|---|---|
| Maximum stack DC voltage, volts | 128 | 128 |
| Maximum initial cell current amps | 105 | 105 |
| Current at end of steps, Amps | 20 | 10.4 |
| Average current during steps | 51 | 40.9 |
| Step process duration, hrs | 2.2 | 3.1 |
| Individual average cell Ahr | 112 | 126 |
| Individual cell energy, whr | 179 | 201.6 |
| Volume of oxygen produced, liters-atm | 2075.5 | 2327 |
| Volume of nitrogen produced, liters-atm | 9600 | 9800 |
| Stack energy consumption, Kwh/m$^3$ N$_2$ | 1.49 | 1.65 |

Table V represents calculated values for the energy consumption related to the production of 96% and 98% nitrogen, namely 1.49 and 1.65 Kwh/m$^3$ N$_2$(STP). These values are based on operating the nitrogen generator at maximum (limiting) current, that is at a cell voltage of 1.6 volts. Since the specific energy consumption (Kwh/m$^3$ of nitrogen) is proportional to the cell voltage energy gains can be achieved at lower cell voltages, that is at currents below limiting currents.

Note: The separation of oxygen from nitrogen starting from an air source is based currently on three principal process technologies: A) low temperature (−200° C.) distillation, an energy-intensive process, B) pressure swing adsorption, divided in TSA temperature swing adsorption, 2) PSA pressure, 3) VSA vacuum and 4) VPSA hybrid process. This technology has been developed mainly with production of medical oxygen as a product, and C) membrane separation.

Process A is mainly used in large industrial installation, whereas B and C are used for compact low volume generation equipment such as for medical uses or bench-top devices for applications that generally do not require large gas volumes and are frequently on stand-by.

Figure 11:
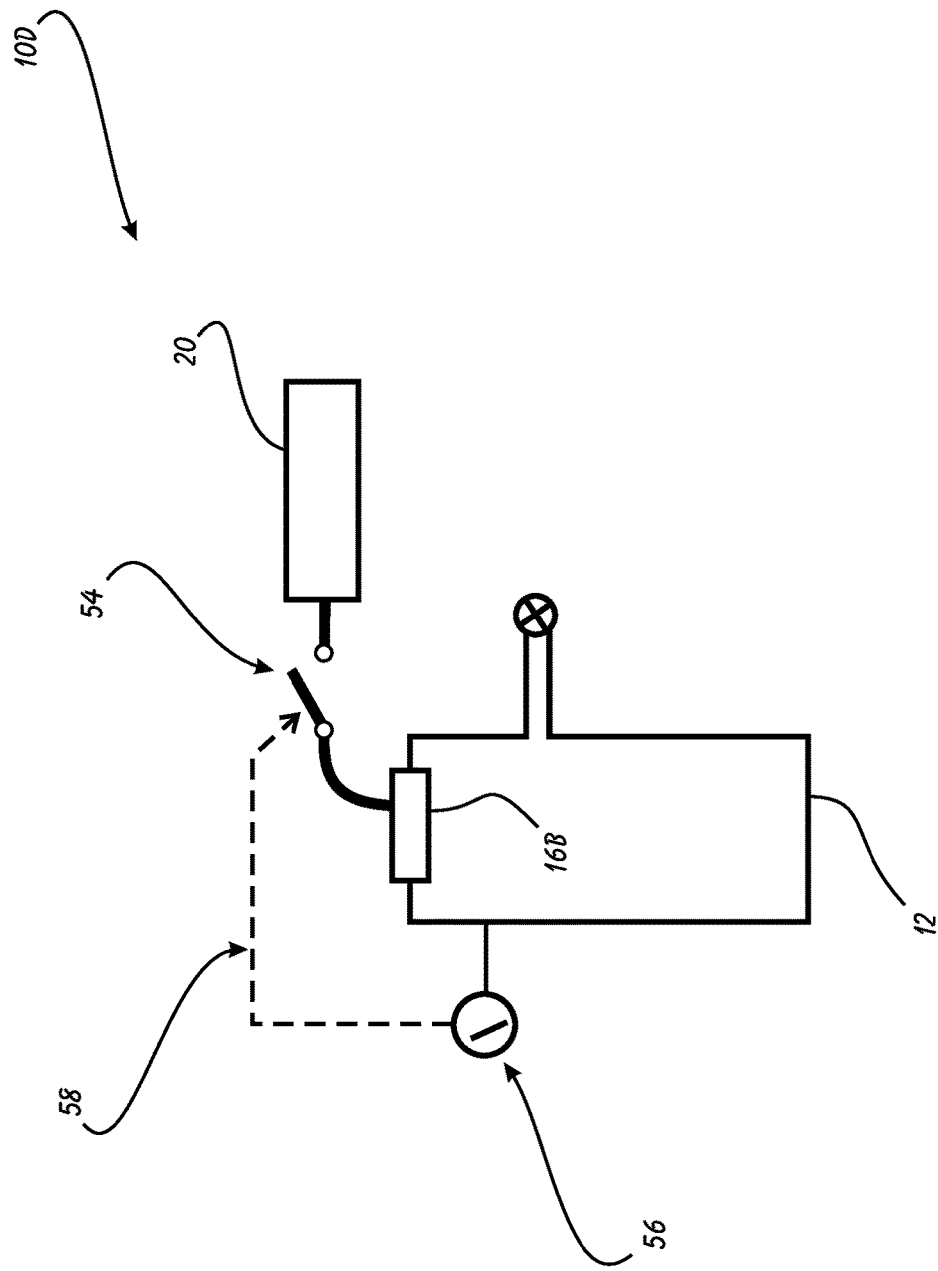
FIG. 11 is a side view of a preferred embodiment of a pressure-controlled $N_2$ concentrator system of the present invention.

FIG. 11 is a side view of a preferred embodiment of a pressure-controlled N$_2$ concentrator system of the present invention. This system 10D is equipped with a pressure sensor 56 (total pressure measurements are adequate instead of specific oxygen concentration measurements) that provides information to the power supply 20, and thus allows to initiate or terminate the extraction process to achieve the desired concentration levels of nitrogen, such as by controlling power switch 54 via control conduit 58 (wired or wireless). Again, in this instance, the gas feed could be air, atmospheric or under pressure, or any other acceptable type of inert gas, pressurized or not, to produce binary, ternary or other multi-component gas mixtures.

While all illustrations have emphasized the production of concentrated nitrogen from air, the technology can also be applied to gas phase enrichment of other binary or multi-component mixtures such as N$_2$/H$_2$, NH$_3$/H$_2$, H$_2$/O$_2$, etc.

The electrolytic cells available for the extraction of oxygen from air are based on the reversible reactions of oxygen and water and the transport of an ionic species across the electrolyte, and the inertness of nitrogen, such that the only reactions are:

½O$_2$+2H$^+$+2e$^-$→H$_2$O, the electrolyte being a water carrying cation membrane, the reversible reaction being the decomposition of water to generate pure oxygen, or ½O$_2$+H$_2$O+2e$^-$→2OH$^-$, the electrolyte being a water carrying anion membrane, both generally operating below 100° C.

Operation at higher temperature (above 400° C.) is possible by using an oxygen ion carrying metal oxide electrolyte to allow for the reversible reaction of ½O$_2$+2e$^-$→O$^=$ The separation of gas phases, as described previously, is not unique to air. It can be applied to other multi-component mixtures composed of at least one electrochemically active component such as:

Hydrogen/C$_1$ to C$_3$ hydrocarbons, resulting from oil cracking, or

Hydrogen/Carbon dioxide, as encountered in the water-gas shift reaction, or

Hydrogen/Nitrogen, as encountered in ammonia production, or

Hydrogen/Chlorine, as encountered in the breakdown of chlorinated plastic materials.

Production costs may be an incentive for hydrogen recovery from oil refining, quality control an incentive for pure hydrogen in fuel cells, etc.

As an example, the electrolytic recovery of hydrogen from a H$_2$/CO$_2$ mixture is performed efficiently by using cation exchange membranes. The reversible reaction:

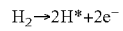

H$_2$→2H$^*$+2e$^-$ takes place essentially without polarization; the electrochemical cell voltage being mainly dependent on cell resistance, i.e. it can operate at high limiting currents and simultaneously compress the gas. CO$_2$ is rejected by the acidic electrolyte for underground storage.

Figure 12:
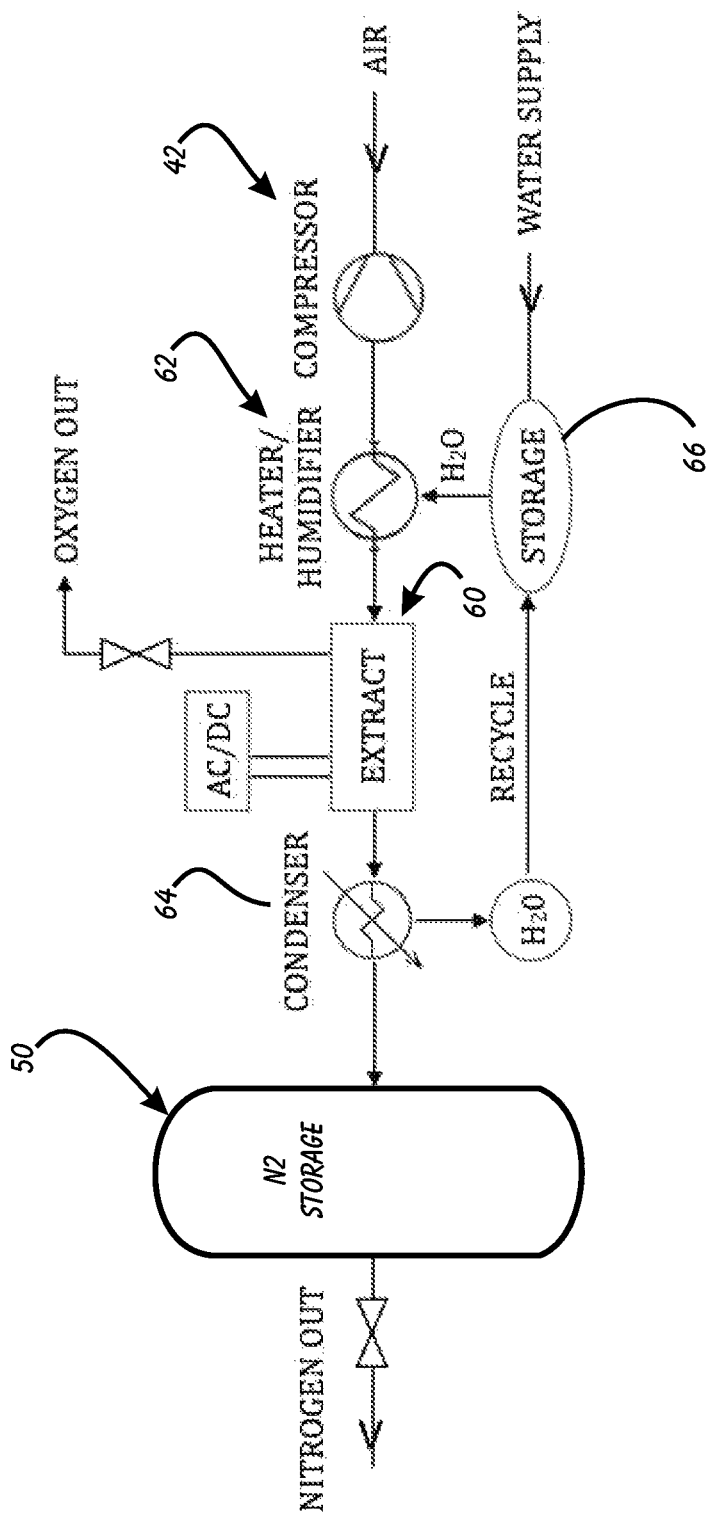
FIG. 12 is a schematic diagram of a preferred embodiment of a high pressure, high temperature N2 concentrator system of the present invention.

FIG. 12 is a schematic diagram of a preferred embodiment of a high pressure, high temperature N2 concentrator system of the present invention. It is now understood that the limiting current of an electrochemical cell (i.e. the current at which the cell operates efficiently) can be raised significantly by increasing the gas temperature to a point in excess of 80 (eighty) degrees Celsius.

When operating in such a high-temperature condition, it is necessary that the incoming air stream is moisturized by a humidifier 62 (which may be a combined heater and humidifier as shown). The O2 is extracted from the gas steam by extractor 60, and then the moisture is removed from the N2 stream via condenser 64.

Figure 13:
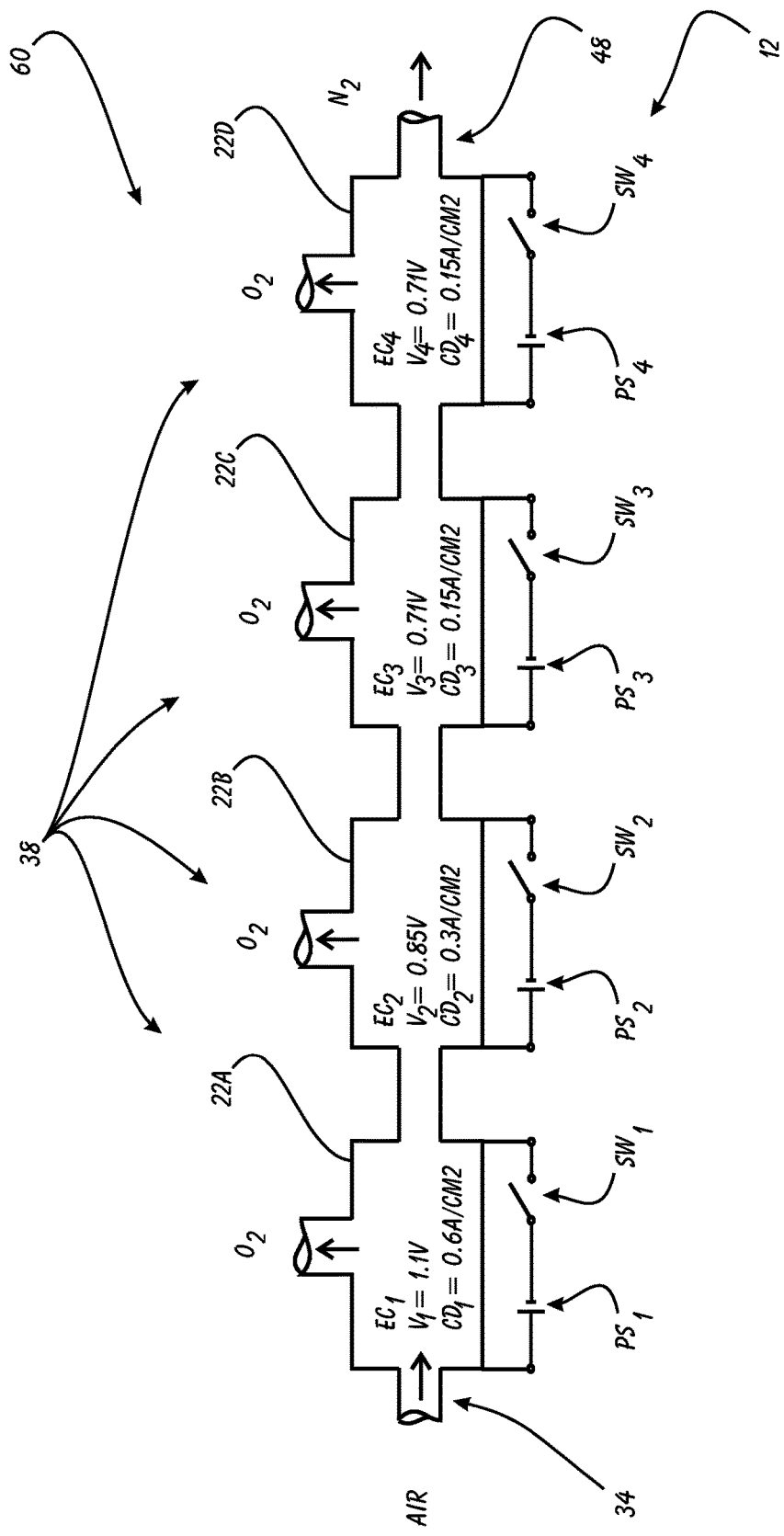
FIG. 13 is a schematic diagram of a preferred embodiment of a sequential independent extractor assembly of the present invention

FIG. 13 is a schematic diagram of a preferred embodiment of a sequential independent extractor assembly 60 of the present invention. As shown here, as gas flows through the housing 12 from air inlet housing 34 to the N2 exit line 48, it passes a series of electrochemical cells 22. Each cell 22A through 22D are arranged in series—that is to say that the gas exiting 22A (predominantly N2) is the inlet gas to cell 22B. Similarly, the (even higher concentration N2) gas exiting cell 22B is the inlet gas to cell 22C, and the gas exiting cell 22D is the inlet gas to cell 22D. Since these cells are arranged as a group that is isolated from atmospheric air, the entire enclosure is referred to as housing 12. Each cell 22A-22D could be individual cells, or they could be cell matrices of some design.

Since the O2 component of the gas at the first cell 22A is much higher than the O2 component of the gas at the fourth cell 22D, first cell 22A is operated at a much higher voltage than fourth cell 22D. The same applies to all four cells 22A-22D, and therefore the operating voltages V1-V4 will be different from cell 1 22A-cell 4 22D. Furthermore, the current density of the cells will also (typically) be different from one another (CD1-CD4 as shown here). Whereas the prior art series-arranged electrochemical cells has always been operated at a consistent voltage and current (and therefore extraction rate), in this embodiment 60, each cell 22A-22D is operated independent from one another in terms of voltage supply (PS1-PS4).

The Voltage and Current values (V and CD) displayed in FIG. 13 are exemplary only, and are provided to convey the relative effect of the reduction of Oxygen concentration on the power requirements of the various stages of the system 60.

Figure 14:
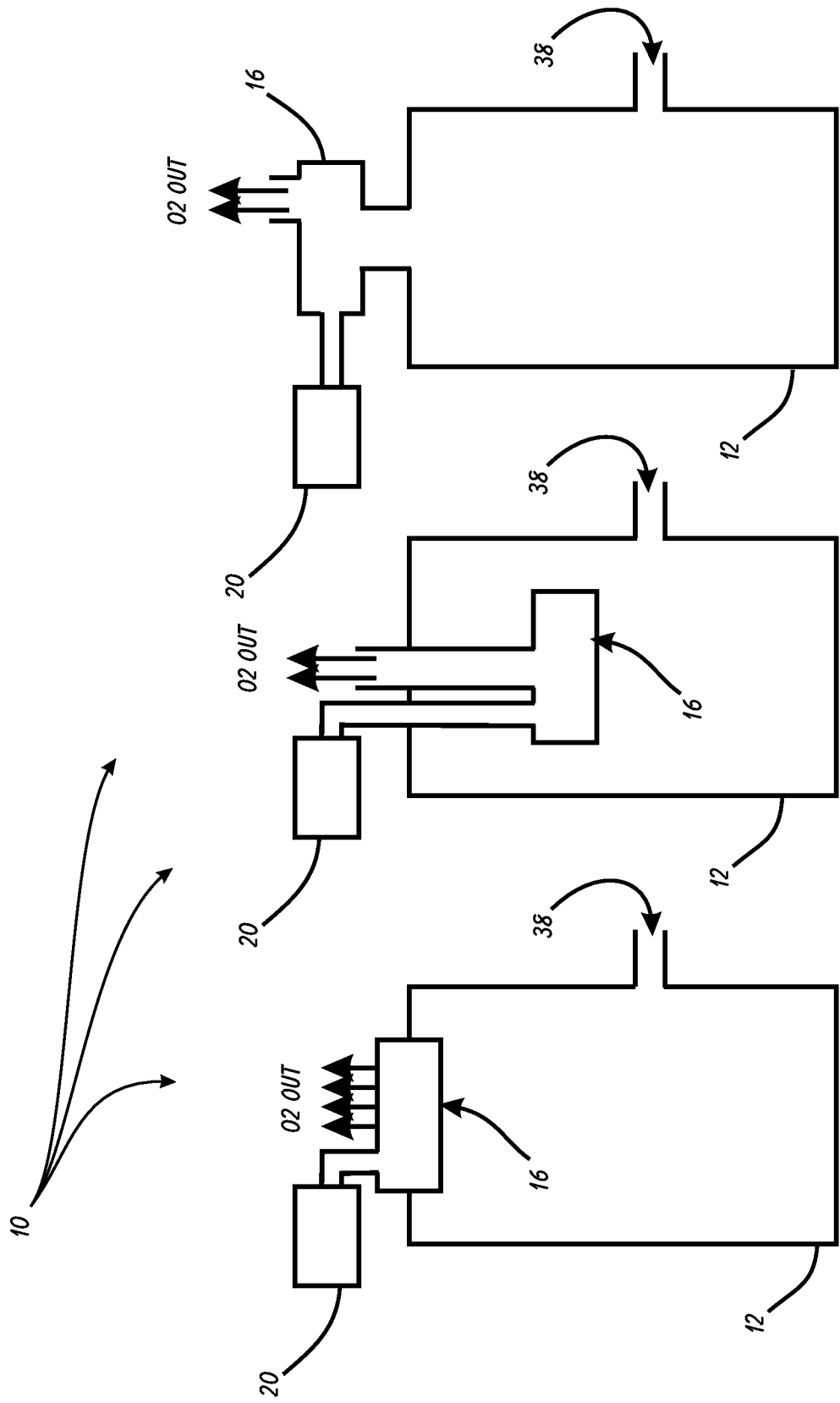
FIGS. 14A, 14B and 14C are cutaway side views of preferred embodiments of continuous-flow and fractionation systems of the present invention.

FIGS. 14A, 14B and 14C are cutaway side views of preferred embodiments of continuous-flow and fractionation systems 10 of the present invention. FIG. 14A has the oxygen extractor (generically labeled as 16) integrated into the top of the container 12. FIG. 14B has the oxygen extractor 16 actually encompassed within the container 12, and FIG. 14C depicts the system 10, wherein the oxygen extractor 16 is external to the container 12. In each of these examples, the system can be operated in a sequential N2 extraction according to the method of FIG. 5, or in a continuous N2 extraction according to the method of FIG. 6. Furthermore, the oxygen extractor 16 could be a single stage as depicted in FIG. 2, or it could be multi-stage (e.g. stacked) extractor as depicted in FIG. 3.

Figure 15:
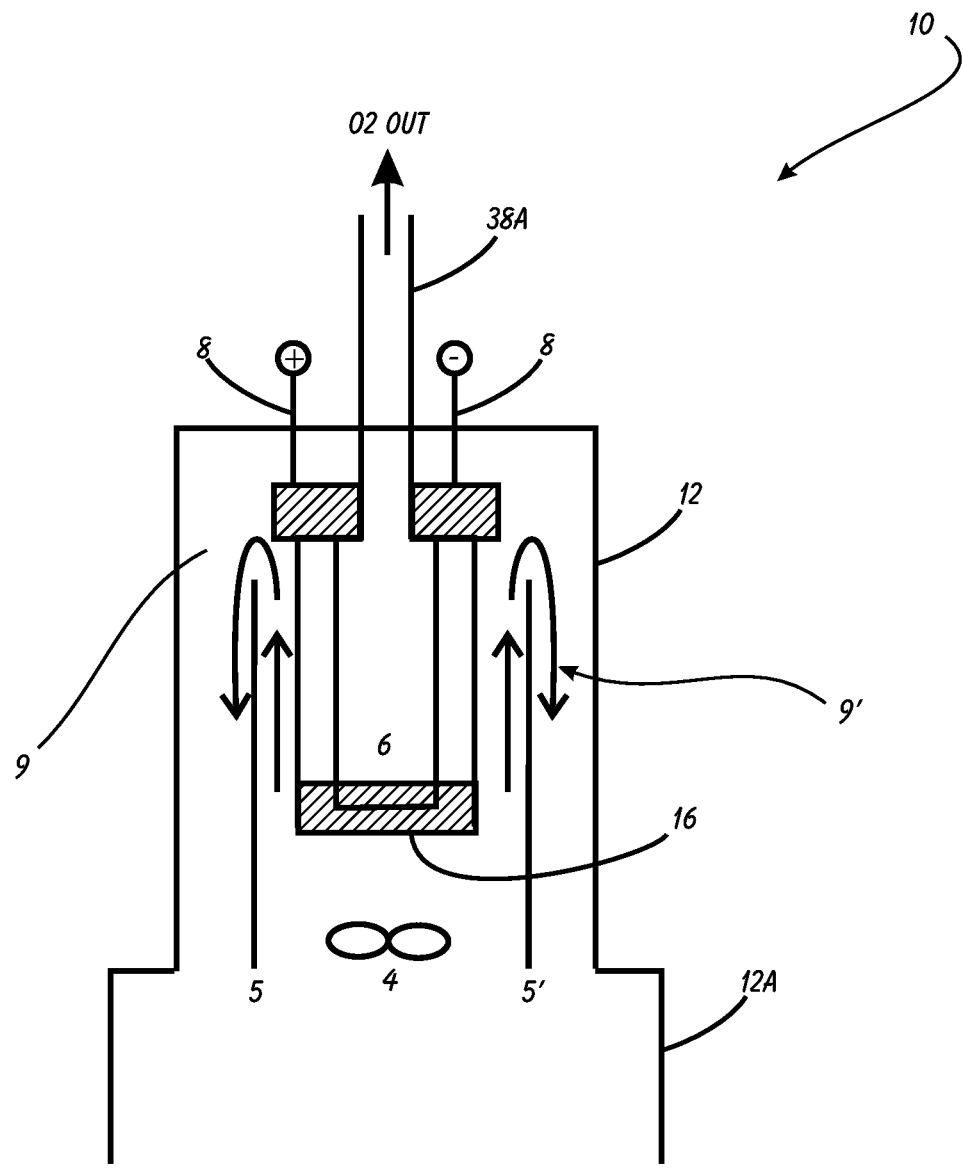
FIG. 15 is a schematic diagram of a preferred embodiment of the present invention wherein the oxygen extractor is located within the nitrogen chamber.

FIG. 15 is a schematic diagram of a preferred embodiment of the present invention 10 wherein the oxygen extractor 16 is located within the nitrogen chamber 12. Here, the portion of the container actually containing the extractor 16 is labeled "12," wherein the portion of the container adjacent to (e.g. below) that containing the extractor is labeled "12A." This notation simply clarifies that the pure air is located (or approaching the extractor 16) from portion 12A, while portion 12 contains air minus oxygen. Since the flow between the two portions is continuous, the concentrations of N2 and O2 within the container 12/12A will have gradients between the two.

In this system 10, mixing fan 4 is driven to rotate such that air is pulled up through baffles 5, 5' in the direction of arrows 9 so that the air passes the oxygen extractor 16 within chamber portion 12 and then remixes with supply air in portion 12A. The anode chamber 6 is "flooded with water" in order to improve efficiency of the extractor 16. In this manner, oxygen is continuously emitted through O2 exit line 38A (as "wet" oxygen). In subsequent (non-depicted) portions of the system 10, the emitted "wet" oxygen will be dried via desiccant or other means.

Oxygen sensor 9 is used to terminate the process once a pre-determined oxygen concentration is achieved. Another way to monitor oxygen concentration is to monitor the current as a function of time to determine the Amp-hours applied to the extractor to ascertain the volume of oxygen extracted from the system.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An apparatus for producing high concentration nitrogen, comprising:
    an extractor assembly, comprising:
        a housing;
        a first electrochemical cell within said housing, said first electrochemical cell configured to extract oxygen from air at a first extraction rate; and
        a second electrochemical cell within said housing, said second electrochemical cell configured to extract oxygen from air at a second extraction rate;
        wherein said first and second extraction rates are not equal;
    an inlet conduit for introducing gaseous air into said housing;
    an electrical power source for selectively supplying electrical power to said first and second electrochemical cells;
    a nitrogen outlet conduit for allowing nitrogen to exit said housing; and
    an oxygen outlet conduit for allowing oxygen to exit said housing.

2. The apparatus of claim 1, further comprising a third electrochemical cell within said housing, said third electrochemical cell, said third electrochemical cell configured to extract oxygen from air at a third extraction rate; and
    wherein said first, second and third extraction rates are not relatively equal.

3. The apparatus of claim 1, wherein said first electrochemical cell comprises an assembly of individual electrochemical cells configured to operate at a common voltage and current.

4. The apparatus of claim 3, wherein said second electrochemical cell comprises an assembly of individual electrochemical cells configured to operate at a common voltage and current.

5. The apparatus of claim 1, wherein said first electrochemical cell is supplied with a first voltage and said second electrochemical cell is supplied with a second voltage; and wherein said first and said second voltage are not equal to one another.

6. The apparatus of claim 5, wherein said first and second voltages are selectively actuated and deactuated relatively independently.

7. The apparatus of claim 1, wherein said inlet conduit is connected to a high pressure air source.

8. The apparatus of claim 1, wherein said nitrogen outlet conduit is connected to a reservoir configured to store gas at a high pressure.

9. An apparatus for continuously separating the components of a gaseous mixture from one another, comprising:
    a chamber defined by an internal volume, a gas intake port and a gas discharge port;
    at least one electrochemical cell assembly defined by an intake side in fluid communication with said internal volume, and a discharge side external to said internal volume;
    a power supply operatively connected to selectively provide power to each said electrochemical cell assembly;
    a gas supply system in fluid communication with said gas intake port configured to selectively and continuously admit a gas mixture into said chamber;
    a gas exhaust system in fluid communication with said gas discharge port configured to selectively and continuously admit a first gas component out of said chamber and into said gas discharge port; and
    control means associated with said at least one electrochemical cell, said gas supply system and said gas exhaust system, said control means configured to cooperatively energize said at least one electrochemical cell assembly, said gas supply system and said gas exhaust system whereby a first gas component comprising said gas mixture is electrochemically separated from said gas mixture via operation of said at least one electrochemical cell assembly and ejected via said discharge side, while a second gas component comprising said gas mixture is simultaneously caused to exit said chamber through said gas exhaust system, while further simultaneously said gas supply system.

10. The apparatus of claim 9, further comprising control means associated with said electrochemical cell assembly, said intake isolation device and said exhaust isolation device, said control means configured to cooperatively energize said electrochemical cell assembly, said intake isolation device and said exhaust isolation device whereby said first gas component is oxygen and is removed by said at least one electrochemical cell assembly from said air gas mixture in said chamber and additional said gas mixture of air is admitted into said chamber to replace said removed oxygen while maintaining the pressure conditions in said chamber at a desired pressure at or above atmospheric pressure.

11. The apparatus of claim 10, wherein said control means is responsive to an oxygen sensor in fluid communication with said chamber.

12. The apparatus of claim 10, wherein said control means is responsive to the rate of electrical current demand by said electrochemical cell assembly.

13. The apparatus of claim 9, wherein:
said electrochemical cell assembly comprises N electrochemical cells; and
said power supply provides power to said electrochemical cell assembly at a rate of between 1.40 and 1.65 volts per cell.

14. The apparatus of claim 9, further comprising a backflow prevention device in said air intake line, said backflow prevention device configured to allow air to enter said chamber, while preventing any gas from exiting said chamber.

15. An apparatus for creating a high nitrogen concentration condition within a chamber, comprising:
an air-filled chamber;
an electrochemical cell assembly in fluid communication with said air-filled chamber;
a power supply operatively connected to selectively provide power to said electrochemical cell assembly;
an air intake line configured to selectively admit air into said chamber at atmospheric pressure;
an oxygen exhaust line configured to selectively release oxygen from said electrochemical cell assembly; and
intake and exhaust isolation devices in fluid communication with said chamber for selectively sealing said chamber from further air intake or oxygen exhaust.

16. The apparatus of claim 15, further comprising control means associated with said electrochemical cell assembly, said intake isolation device and said exhaust isolation device, said control means configured to cooperatively energize said electrochemical cell assembly, said intake isolation device and said exhaust isolation device whereby oxygen is removed by said electrochemical cell assembly from air in said chamber and additional air is admitted into said chamber to replace said removed oxygen while maintaining the pressure conditions in said chamber at approximately said selected pressure.

17. The apparatus of claim 16, wherein said control means is responsive to an oxygen sensor in fluid communication with said chamber.

18. The apparatus of claim 16, wherein said control means is responsive to the rate of electrical current demand by said electrochemical cell assembly.

19. The apparatus of claim 15, wherein:
said electrochemical cell assembly comprises N electrochemical cells; and
said power supply provides power to said electrochemical cell assembly at a rate of between 1.40 and 1.65 volts per cell.

20. The apparatus of claim 15, further comprising a backflow prevention device in said air intake line, said backflow prevention device configured to allow compressed air to enter said chamber, while preventing any gas from exiting said chamber.

* * * * *